United States Patent [19]

McDonnell et al.

[11] Patent Number: 4,847,687
[45] Date of Patent: Jul. 11, 1989

[54] VIDEO RANGING SYSTEM

[75] Inventors: Robert L. McDonnell, Loveland; Ralph M. Somers, West Chester; Roland K. Wilhelm, Cincinnati, all of Ohio

[73] Assignee: General Electric Company, Cincinnati, Ohio

[21] Appl. No.: 182,631

[22] Filed: Apr. 18, 1988

[51] Int. Cl.$^4$ .................... H04N 7/18; G01L 3/08
[52] U.S. Cl. .................... 358/101; 356/4; 358/107; 369/45; 901/47
[58] Field of Search .......... 358/101, 107, 93; 901/47; 356/3, 4; 355/43, 55; 369/45

[56] References Cited

U.S. PATENT DOCUMENTS

| | | | |
|---|---|---|---|
| 3,786,184 | 1/1974 | Pieters | 358/227 |
| 3,895,870 | 7/1975 | Cullen | 356/4 |
| 3,918,071 | 11/1975 | Albrecht | 354/25 |
| 4,146,327 | 3/1979 | Harris | 356/4 |
| 4,204,772 | 5/1980 | Balasubramanian | 356/4 |
| 4,257,703 | 3/1981 | Goodrich | 356/4 |
| 4,282,548 | 8/1981 | Plummer | 358/107 |
| 4,435,079 | 3/1984 | Hennick | 356/123 |
| 4,584,704 | 4/1986 | Ferren | 358/227 |
| 4,614,975 | 9/1986 | Kaite | 358/227 |
| 4,673,795 | 6/1987 | Ortiz, Jr. | 219/121 L |
| 4,739,158 | 4/1988 | Kato | 356/4 |
| 4,743,771 | 5/1988 | Sacks | 356/4 |
| 4,767,934 | 8/1988 | Stauffer | 356/4 |

Primary Examiner—Howard W. Britton
Attorney, Agent, or Firm—James M. Stover; Derek P. Lawrence

[57] ABSTRACT

A non-contacting sensing method and apparatus is disclosed for positioning a surface, such as the surface of a workpiece. A collimated light beam is projected through a lens having a known focal length onto the surface. Suitable means such as a television camera is positioned to receive light reflected from the surface and provide a series of video pulses, wherein the number of pulses produced per television frame scan corresponds to the size of the light image focused onto the photosensitive element within the camera. The position of the surface relative to the lens is varied until the number of pulses produced per scan is at a minimum.

31 Claims, 7 Drawing Sheets

VIDEO RANGING SYSTEM

The present invention relates in general to a non-contact sensing method and apparatus for positioning a surface and more specifically to a non-contact surface range sensor for automated machining or laser drilling operations.

BACKGROUND OF THE INVENTION

In the field of automated machining, a numerically controlled machine tool positioning system (CNC) is often used in conjunction with a probe sensor to position a workpiece surface which is to be drilled, cut, welded or machined. During the probing cycle, either the workpiece or the probe is moved by the positioning system until contact between the workpiece and probe occurs. Upon contact, the probing system provides a "trip" signal to the positioning system which then records the location of the workpiece. Typically, the probe sensor is a mechanical stylus or other contact probe. The probe has to be made compliant enough to withstand accidental shocks and overtravel, yet be able to accurately return to its initial position.

Mechanical stylus probing systems present additional difficulties, particularly in laser machining operations. First, the probe must be displaced from the drilling light path to prevent destruction of the probe by the laser beam. Second, in traditional machining equipment the probe consumes a tooling position. In a laser machining system where there are no tool holders, a special positioning device would be required to accommodate the probe. Additionally, a mechanical probe requires an external, absolute reference for calibration before every probe cycle. The reference must maintain an exact relationship between itself, the part fixture and the machining equipment. This relationship must be insensitive to the environment and must be kept clean. If this reference is damaged, it must be replaced and the machine recalibrated. Finally, the probing system requires a regular maintenance schedule to maintain accuracy.

In many machine tools, including lasers used for drilling, cutting, or welding, a visible Helium Neon laser beam is used for positioning and alignment of the workpiece by an operator. In addition, many machine tools are equipped with a television camera system to view the machining operation. The present invention utilizes these existing components to automatically position a workpiece surface without physically contacting the surface. Thus, the present invention can be installed into an existing machine tool system easily and at a relatively small cost in comparison to a "contact" probing system.

OBJECTS OF THE INVENTION

It is a primary object of the present invention to provide a method and apparatus for positioning a workpiece surface in a manufacturing process which are not subject to the disadvantages associated with a mechanical probe.

It is an additional object of the present invention to provide a new and useful method and apparatus which utilize a conventional light beam source and a television camera for positioning a workpiece surface in an automated machining process.

It is a further object of the present invention to provide a new and useful method and apparatus for performing surface tracking It is also an object of the present invention to provide a new and useful method and apparatus for locating workpiece edges.

SUMMARY OF THE INVENTION

In accordance with the principles of the present invention, there are provided a method and apparatus for positioning a surface, such as the surface of a workpiece in a manufacturing process. In one form of the invention, a shape is formed on an illuminated surface of the workpiece. An imaging means including a lens having a known focal length receives light reflected from the surface and forms an image of the shape formed on the workpiece surface. The size of the image is measured as the position of the surface relative to the lens is varied. The surface is ultimately positioned to minimize the size of the image.

The above and other objects of the present invention together with the features and advantages thereof will become apparent from the following detailed specification when read in conjunction with the accompanying drawings in which applicable reference numerals have been carried forward.

DETAILED DESCRIPTION OF THE INVENTION

Figure 1:
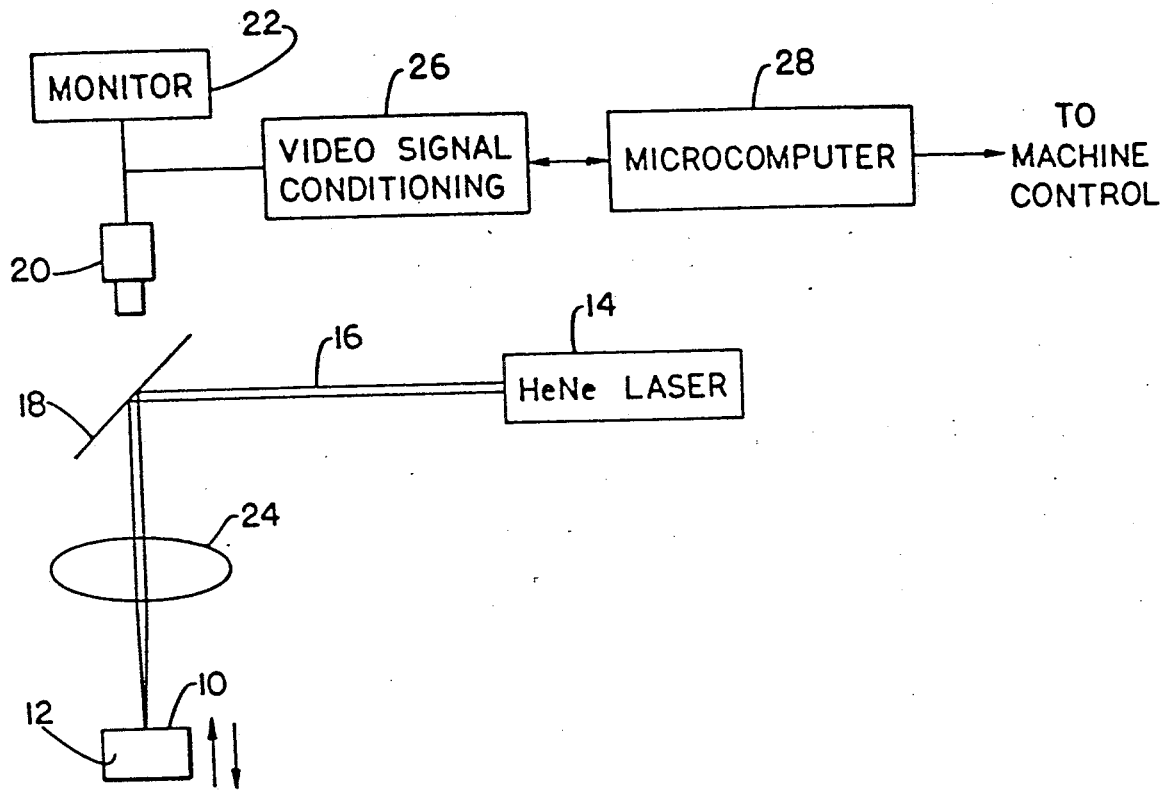
FIG. 1 is a block diagram of a preferred embodiment of the present invention.

Referring now to the drawings, FIG. 1 is a block diagram of a preferred embodiment of the invention. The major components of the invention include a low power visible Helium Neon laser device 14 for generating a collimated light beam 16, a dichroic mirror 18, a television camera 20 connected to a monitor 22 and a focusing lens 24 having a known focal length. A video signal processing electronic circuit 26 is connected to receive the video output of camera 20 and provide data to a microcomputer 28.

In operation, laser device 14 generates HeNe laser beam 16 which is directed at the reflective surface of dichroic mirror 18. Mirror 18 redirects laser beam 16 to lens 24 which functions to focus the light beam at the lens focal point. Workpiece 12 is placed in the path of the focused light beam. Placement of workpiece 12 can be effectuated manually or automatically by the machine tool positioning system (not shown) which controls the operation of the machining process.

Television camera 20 is positioned to view through dichroic mirror 18 at the light spot formed on surface 10 of workpiece 12 by impingement of light beam 16. An image of the light spot is formed on the photosensitive element within camera 20 and converted by the scanning mechanism within the camera into a composite video signal comprising a series of pulses of varying amplitudes.

This composite video signal includes vertical and horizontal synchronization data in addition to information pertaining to the image formed on the photosensitive element. The composite video signal is provided to monitor 22 and video signal processing electronic circuit 26. Circuit 26 separates the composite video signal into vertical synchronization, horizontal synchronization, and video pulses and generates a series of logic pulses. The number of logic pulses generated between vertical sync pulses, i.e. during one scanning cycle, is proportional to the size of the image formed on the photosensitive element within camera 20. The logic pulses are accumulated during each scanning cycle and the total provided to microcomputer 28.

As the machine tool positioning system (CNC) incrementally adjusts the position of workpiece 12 in relation to lens 24, the size of the spot image reflected onto the photosensitive element within camera 20 and therefor the logic pulse total generated by circuit 26 varies. Microcomputer 28 compares the pulse count total generated during each scan to the lowest pulse count total generated during the probing cycle. The lowest pulse count, i.e. the smallest spot image size, will occur when surface 10 is positioned at the focal point of lens 24.

Figure 2:
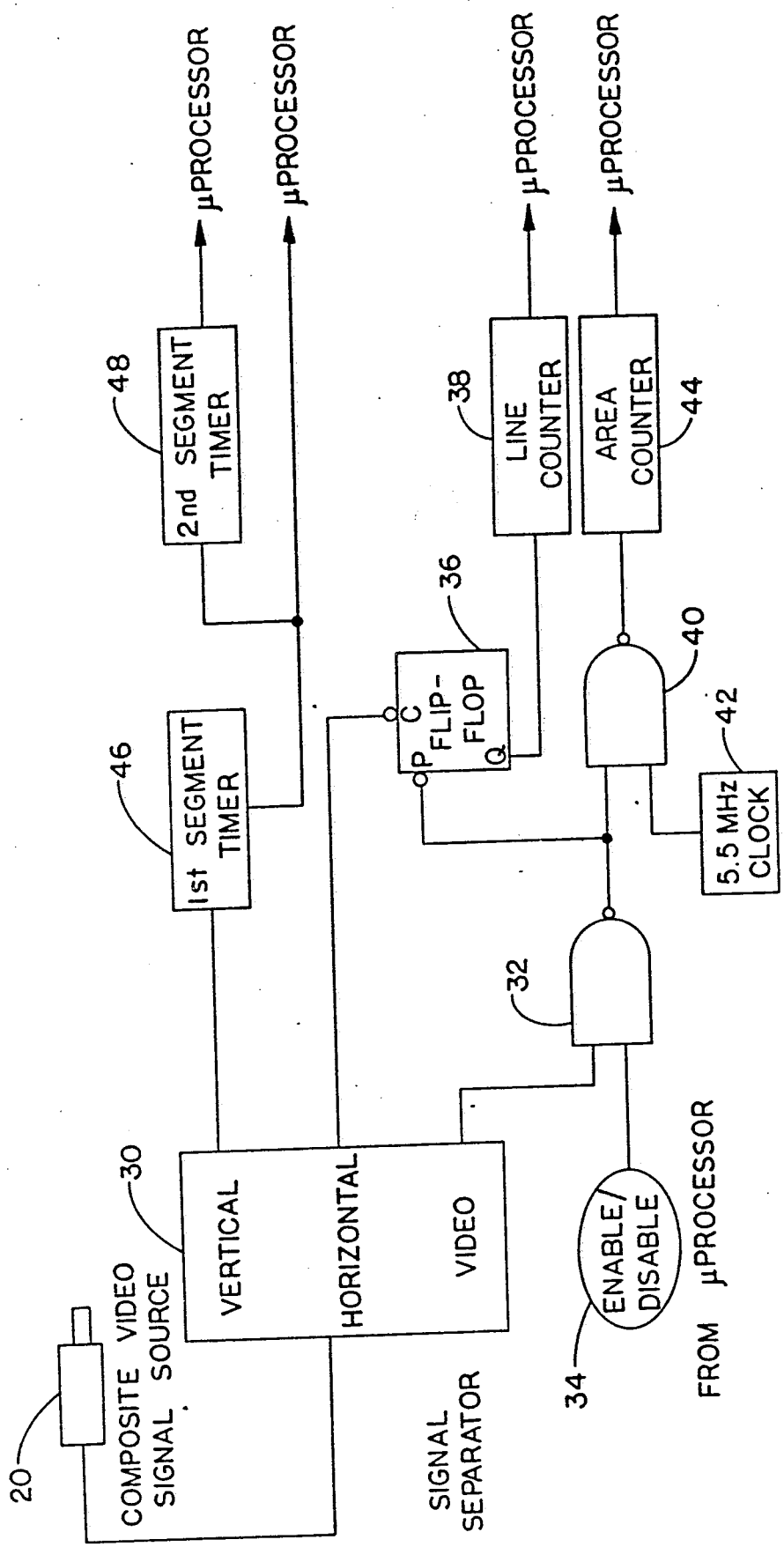
FIG. 2 is a simplified elementary circuit diagram of a portion of FIG. 1, showing one arrangement of components within the video signal processing electronic circuit.

FIG. 2 shows a simplified elementary circuit diagram of circuit 26 which receives input from camera 20 and microcomputer 28 and provides output to microcomputer 28. Signal separator 30 extracts from the composite video signal vertical synchronization and horizontal synchronization signals and generates logic level video pulses. The vertical synchronization signal comprises a single logic level pulse occurring contemporaneously with the begining of every new frame scan (or vertical scan) by camera 20. The horizontal synchronization signal comprises a series of logic level pulses, wherein each pulse coincides with the start of a new line scan (or horizontal scan) by camera 20.

The video pulses generated by signal separator 30 are of uniform height, such as five volts, but vary in width or duration corresponding to the width of the spot image encountered during any horizontal scan by camera 20. For example, when the image reflected onto the photosensitive element of camera 20 is circular, a horizontal scan through the center of the image will produce a video pulse of maximum width or duration. The width of this pulse would correspond to the diameter of the circular image. A horizontal scan through any other portion of the image will produce a video pulse of proportionately smaller width. This last-recited pulse would have a width corresponding to the length of the chord defined by the intersection of the circular image and the horizontal scan line.

The video pulses are provided to the preset terminal, identified as "P", of a flip-flop 36 through an AND gate 32. AND gate 32 functions to pass the video pulses through to flip-flop 36 or to block transmission of the video pulses in response to an enable/disable command 34 received from microcomputer 28. Video pulse transmission is permitted when the enable/disable command has a logic value of one (five volts) and inhibited when the enable/disable command has a logic value of zero (zero volts). The horizontal synchronization signal is provided to the clock input, identified as "C", of flip-flop 36.

A signal having a logic level of one is generated at the non-inverting output, "Q", of flip-flop 36 and provided to a counter 38 when the input received at input P has a logic value of one. Output Q remains high until a horizontal synchronization pulse is received at the clock input C. Thus, a single logic pulse, which will be referred to as a line pulse, is provided to counter 38 for every horizontal scan which crosses a portion of the spot image.

The vertical synchronization signal extracted from the video signal by signal separator 30 is provided to two timing circuits 46 and 48. A conventional television camera scans at a rate of 60 frames per second or one frame every 16.7 milliseconds. First segment timer 46 provides a signal to the microcomputer 28 five milliseconds after receiving each vertical synchronization signal from signal separator 30, i.e. after approximately one-third of a frame has been scanned. Second segment timer 48 provides a signal to the microcomputer twelve milliseconds after receipt of each vertical synchronization signal, i.e. after approximately two thirds of a frame has been scanned by camera 20. Thus, each frame is divided into three segments. The first portion of the frame scan is 5 milliseconds, the middle portion is 7 milliseconds, and the last portion is 4.7 milliseconds.

When the camera and workpiece are properly aligned, the spot image formed on the photosensitive element within camera 20 will appear in the center portion of each frame scan. Microcomputer 28 instructs circuit 26 to generate and accumulate line pulses during the center portion of each frame scan and evaluates the line pulse total received from counter 38 during the last portion of each frame scan. Upon receipt of the first segment signal generated by timer 46, the microcomputer provides an enable signal to circuit 26 to begin counting line pulses. Upon receipt of the second segment signal generated by timer 48, the microcomputer provides a disable signal to circuit 26, obtains the line pulse total from counter 38, and analyzes the information obtained.

Figure 3:
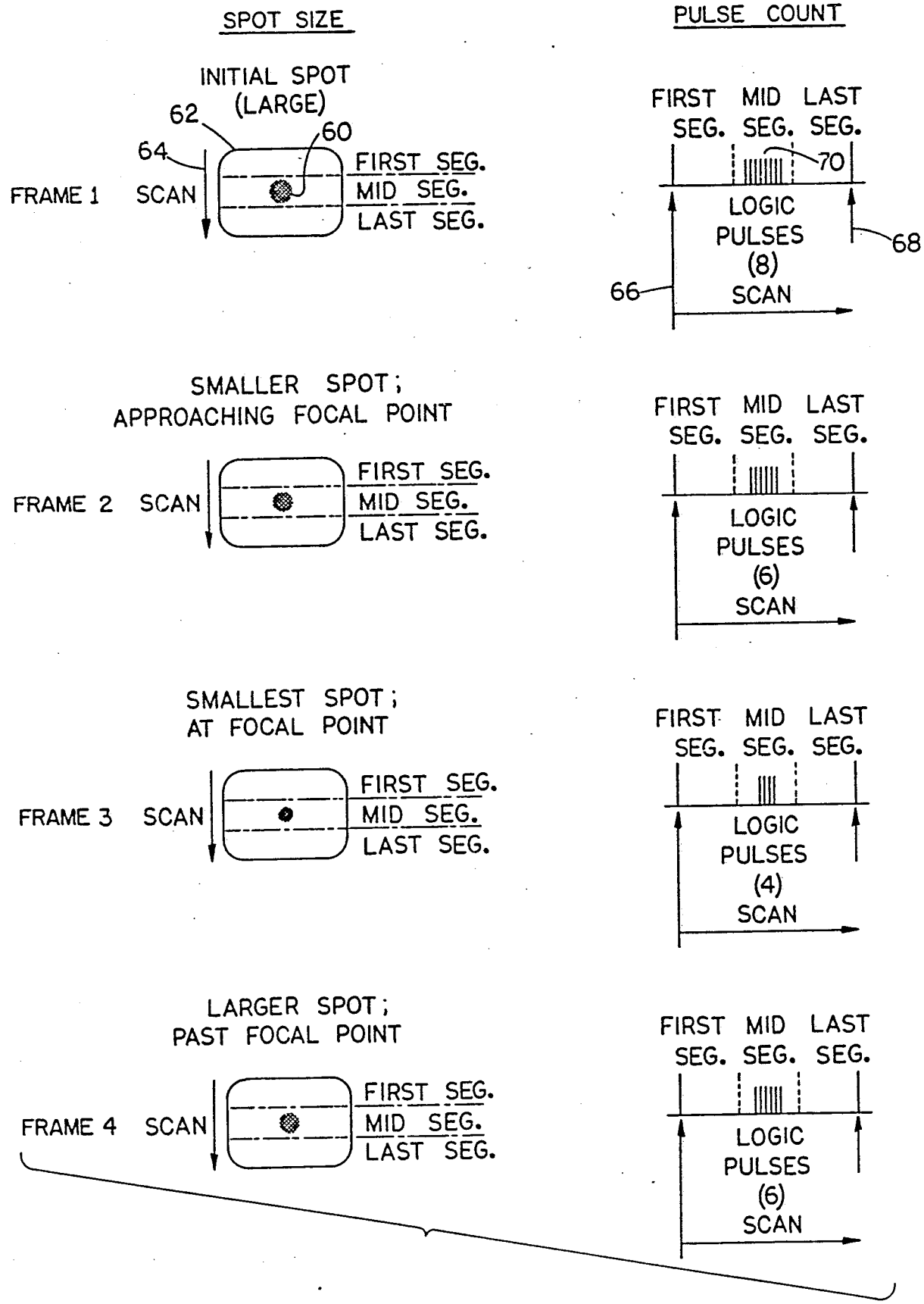
FIG. 3 illustrates the change in spot image size at several points in the probing sequence.

FIG. 3 illustrates the change in spot image size and line pulse count at several points in the probing sequence. Under the heading titled "SPOT SIZE" there are shown four frames scanned by the television camera at different points in the probing sequence. Each frame shows a spot image 60 centered within the frame 62. Each frame is shown to be partitioned into three sections designated first segment, middle segment and last segment, which correspond to the three segments of the frame scan discussed previously. The television vertical scan is in the direction shown by arrow 64. Under the heading titled "PULSE COUNT" there are shown four graphs, each graph corresponding to the frame and spot image located to the left of the graph. Each graph shows the occurrence of line pulses 70 during the corresponding frame scan by the television camera. Arrows 66 and 68 indicate the occurrence of vertical synchronization pulses, each pulse indicating the beginning of a frame. The graph is also shown to be segmented into first, middle and last segments, again corresponding to the frame scan portions discussed previously. All of the line pulses are shown to occur in the middle segment of the graph as the spot image is positioned in the middle of the frame.

In frame 1 the spot image is shown to be relatively large. Eight line pulses are produced during the scan of frame 1. After adjustment of the position of workpiece 12 toward the focal point of lens 24 (see FIG. 1) a smaller spot image is obtained. Frame 2 shows this smaller spot image. Six line pulses are produced during the scan of frame 2. Frame shows the spot image size produced when surface 10 of workpiece 12 is positioned at the focal point of lens 24. Four pulses are produced during the scan of frame 3. Frame 4 indicates that further adjustment of the position of the workpiece after the workpiece surface has been placed at the focal point will result in a larger spot image size and a larger line pulse count.

It should be noted that the generation of line pulses shown in FIG. 3 and discussed above is examplary only. Actual line pulse totals may range from a low of 20 to 30 pulses per scan for an image of minimum size to a high of 70 to 80 pulses per scan.

Figure 4:
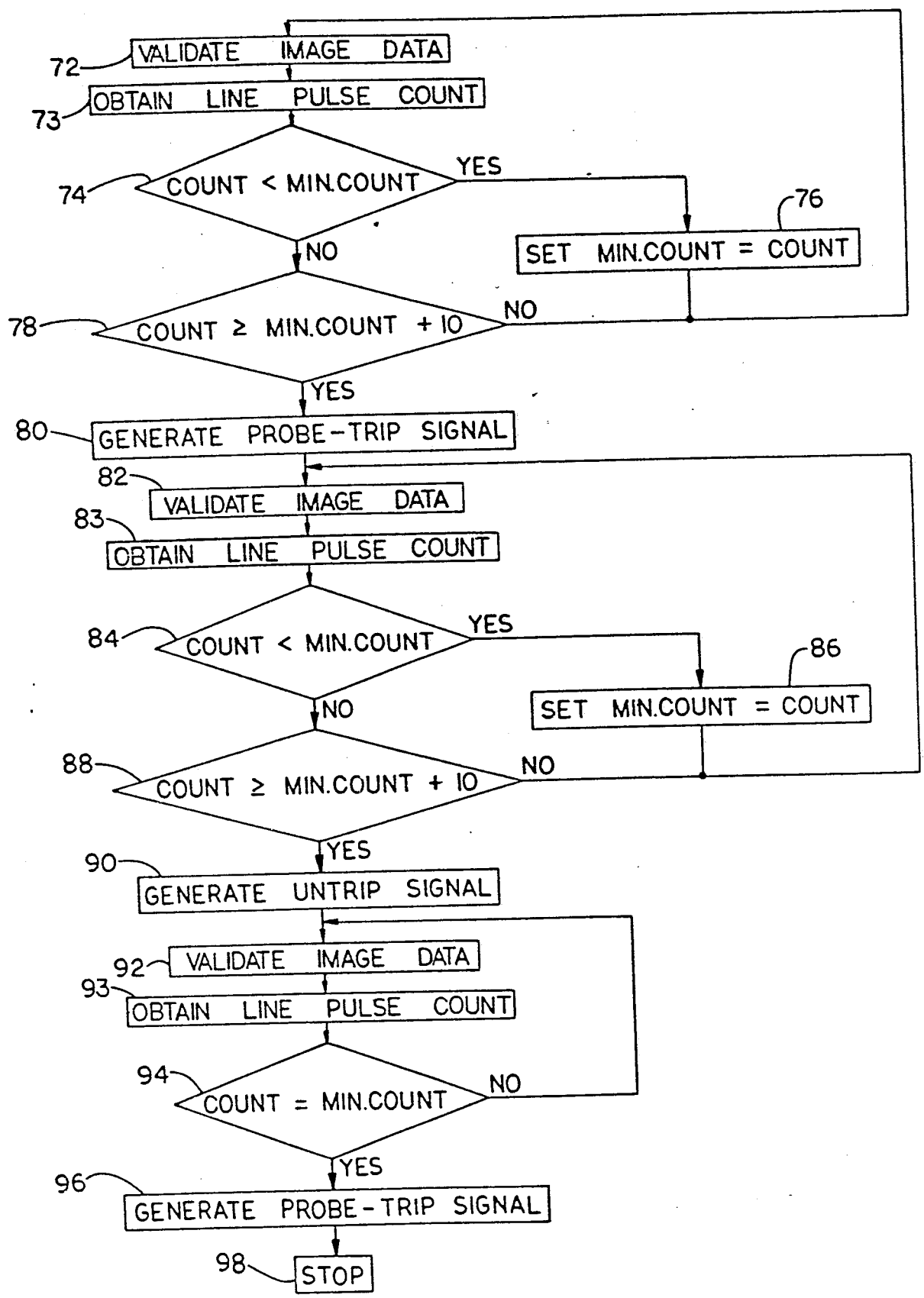
FIG. 4 is a flow chart of the process performed by the microcomputer shown in FIG. 1.

Reference is now made to FIG. 4 which is a flow diagram of the processes performed within microcomputer 28 during one probing cycle. The microcomputer program analyzes the signals from the video signal processing circuit and generates information for the CNC, and also responds to control signals from the CNC. The probing cycle executed by the CNC is part of a pre-programmed or "canned cycle" that is built into the CNC or written by the user. The CNC probing cycle descibed below is a two-pass type in which the motion axis reverses directions two times. The axis initially moves in a first direction until a "trip" signal is received from the processing circuit. The axis then reverses direction and moves until an "untrip" signal is received. Finally, the axis reverses again and moves in the original direction until a second and final "trip" signal is received.

Execution of the program shown in FIG. 4 begins after the workpiece has been positioned in the path of light beam 16 and an enable signal has been received by the microcomputer from the CNC. The program first verifies that valid image data is being received from circuit 26 (block 72). Once validity has been established, the microcomputer reads the line pulse count from counter 38 (block 73). The line pulse count obtained is the total of pulses generated by circuit 26 during the middle segment of one scanning cycle. The line pulse count obtained is then compared to the minimum count value (MIN.COUNT) obtained during previous scanning cycles. If the new line pulse count is less than the stored minimum value, or no previous value for MIN.-COUNT exists, MIN.COUNT is set equal to the new pulse count value and program execution returns to block 72. If the new count value is greater than or equal to MIN.COUNT but less then MIN.COUNT + ten percent, program execution also returns to block 72. The process shown in blocks 72 through 78 continues while the CNC adjusts the position of the workpiece in an initial direction until a pulse count value equal to or exceeding 110 percent of the stored minimum value is obtained, indicating that the workpiece surface is being moved away from the focal point of lens 24 (block 80). At this point a probe-trip signal is generated and supplied to the positioning system instructing the positioning system to reverse the direction of movement of the workpiece.

The process shown in blocks 82 through 88 corresponds to the process of blocks 72 through 78, only the direction of movement of the workpiece by the CNC has been reversed. When the new pulse count again equals or exceeds 110 percent of the stored minimum value of "untrip" signal is generated (block 90. When the CNC receives the "untrip" signal, it reverses the workpiece travel direction a second time so that the workpiece surface is again traveling toward the lens focal point, but at a slower speed. A second probe-trip signal is generated (block 96) when the workpiece is positioned such that the line pulse count equals the previously stored minimum value (blocks 92 and 94). This second probe-trip signal informs the CNC that the workpiece surface is positioned at the lens focal point.

Referring again to FIG. 2, a second AND gate 40 is seen connected to receive the video pulses from AND gate 32 and a series of clock pulses from a 5.5 megahertz clock 42. The input from clock 42 is passed through to microcomputer 28 whenever a video pulse is received by AND gate 40. The area counter 44 aggregates the clock pulses received during each frame scan by television camera 20 and supplies the clock pulse total to microcomputer 28. The total of clock pulses received by microcomputer 28 during one frame scan by camera 20 is directly proportional to spot image area. AND gate 40 and clock 42 thus provide an input to microcomputer 28 which can be used to validate area measurements obtained by counting the line pulses generated by flip-flop 36. Additionally, the process of FIG. 4 can be modified to count clock pulses rather than line pulses.

In the case of a circular spot image, the total of clock pulses received by microcomputer 28 during one frame scan by camera 20 is a direct measurement of the area of the spot image, whereas the line pulse total is a direct measurement of the diameter of the spot image. Spot image area can be calculated from the diameter of the spot, i.e. line pulse total, by using the equation: Area $= pi \times (diameter/2)^2$. When the spot image is well defined, without spurious background "clutter", the computed area and the measured area (obtained from the clock pulse total) should correlate within a small percentage.

Figure 5:
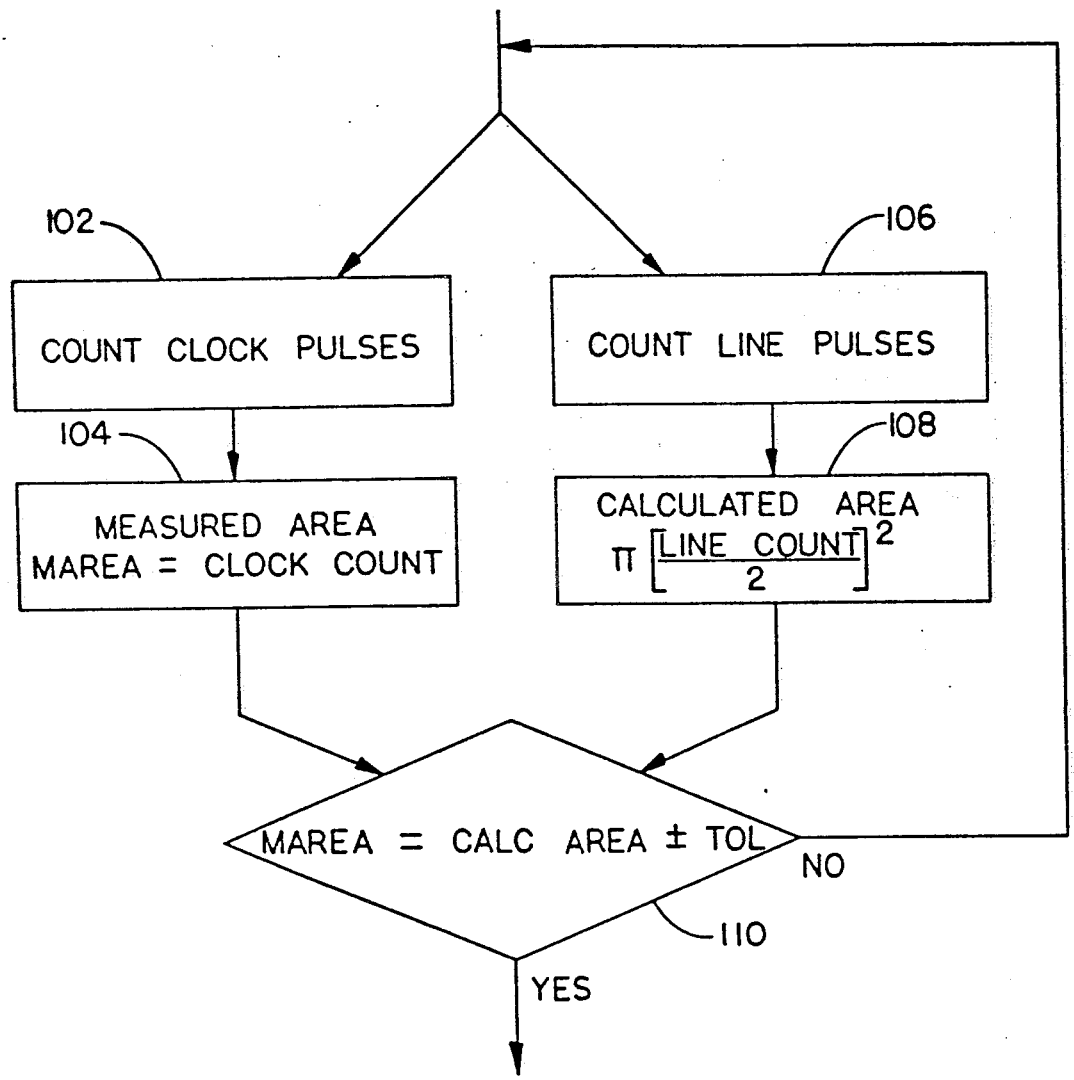
FIG. 5 is a flow chart of a process for validating spot image measurements.

The above-described procedure for verifying spot image data can be easily incorporated into the microcomputer program described in connection with FIG. 4. FIG. 5 is a flow diagram illustrating the additional process steps required to verify spot image data. These process steps replace block 72 of FIG. 4. Similarly, blocks 82 and 92 of FIG. 4 would be replaced with the process steps shown in FIG. 5. As modified, the program determines the spot image area directly from the clock pulse total obtained from counter 44 (blocks 102 and 104), and calculates the spot image area from the line pulse count obtained from counter 38 (blocks 106 and 108). The measured area, MAREA, is then compared with the calculated area (block 110). If the measured area and calculated area agree to within a predetermined tolerance, the program continues to block 73 of FIG. 4. If the measured and calculated areas are in disagreement, the process steps shown in blocks 102 through 110 are repeated.

It should be noted that the embodiment of the invention described above measures the size of the spot image formed on the photosensitive element within camera 20 and not the size of the illuminated area on the workpiece surface. Accordingly, laser beam 16 in FIG. 1 can be focused directly onto surface 10 without passing through focusing lens 24, creating a light spot on surface 10 that will not vary with the distance between lens 24 and surface 10. The system can also be modified to view a paint spot, a shadow, or a hole formed on the surface rather than a light spot. Alternatively, the invention can be constructed to measure the size of the light spot formed on surface 10 by light beam 16 and lens 24, in which case a television camera can be positioned to view the workpiece surface directly, rather than through lens 24.

A major advantage of this invention is a low cost, highly accurate means for determining the location of a surface, without having to know the size of the spot image, since the system searches only for a minimum spot size. Accuracy is primarily determined by the optical system and the precision of the machine tool positioning system. The invention is capable of measuring an image size to within one pulse value, and the magnification of the camera lens determines the number of pulses produced per image. Assuming a minimum image size on the workpiece surface of 0.01 inch, and a magnification factor of 10 on the camera lens, the invention can determine the focal distance to plus or minus 1 mil. For greater optical magnification, the accuracy is correspondingly greater.

Further modification and additions to the processing steps discussed above and illustrated in FIGS. 4 and 5 permit the video ranging system to perform functions such as surface tracking and edge finding.

Figure 6:
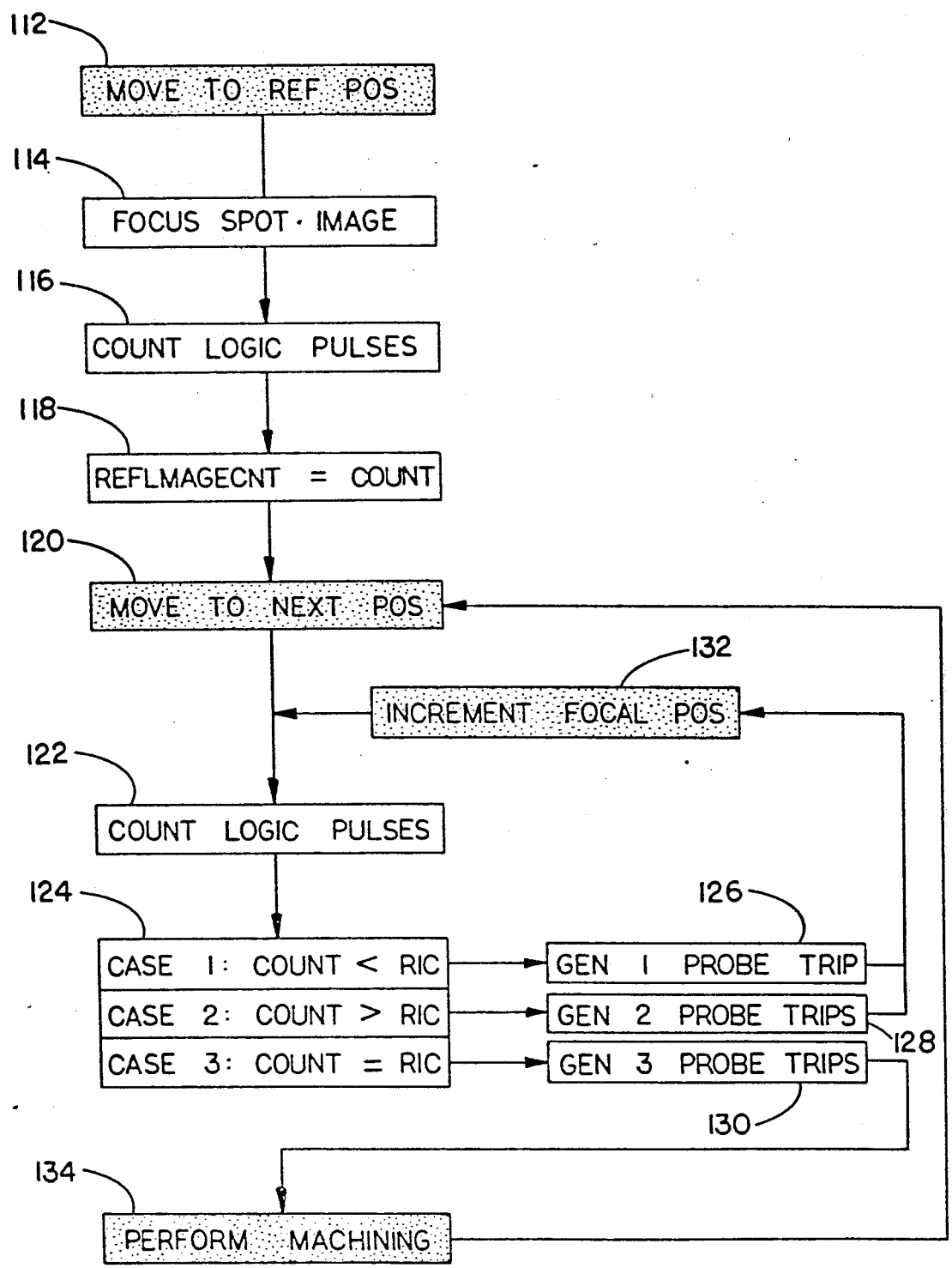
FIG. 6 is a flow chart of a process for performing surface tracking.

Since changing the distance between camera 20 and the workpiece surface 10 in FIG. 1 changes the size of the spot image, the video ranging system is capable of generating a signal which enables the CNC to hold an arbitrarily assigned spot image size, thus maintaining a constant distance between the machining point and the workpiece surface. FIG. 6 is a flow chart showing the additional process steps necessary to perform surface tracking. The shaded blocks in FIG. 6 refer to functions performed by the CNC. The workpiece surface is first positioned in the path of light beam 16 (block 112) and the process steps of FIG. 4 are executed to focus the spot image (block 114). Logic pulses, which can be either line pulses or clock pulses, are counted (block 116) and the total produced during one scan stored as the variable REFIMAGECNT or RIC (block 118). The workpiece is then postioned by the CNC at the point where machining is to begin (block 120). Another logic pulse count is performed (block 122), and the result compared to the value stored in RIC (block 124). Depending on the relationship between reference image count RIC and the current image count, one, two, or three consecutive probe trip signals will be generated (block 126 through 130). The number of trip signals indicate to the CNC what action is to be taken. The focal position is incremented (block 132) until the current count is equal to reference image count RIC. Once the spot size has been adjusted to the original tracking spot size, the CNC commences with drilling, welding, or other machining of the workpiece (block 134). The CNC then repositions the workpiece, and the process of blocks 120 through 136 is repeated. The final coordinates associated with each position of the workpiece surface can be stored and the path defined by the coordinates retraced without invoking the surface tracking function.

Figure 7:
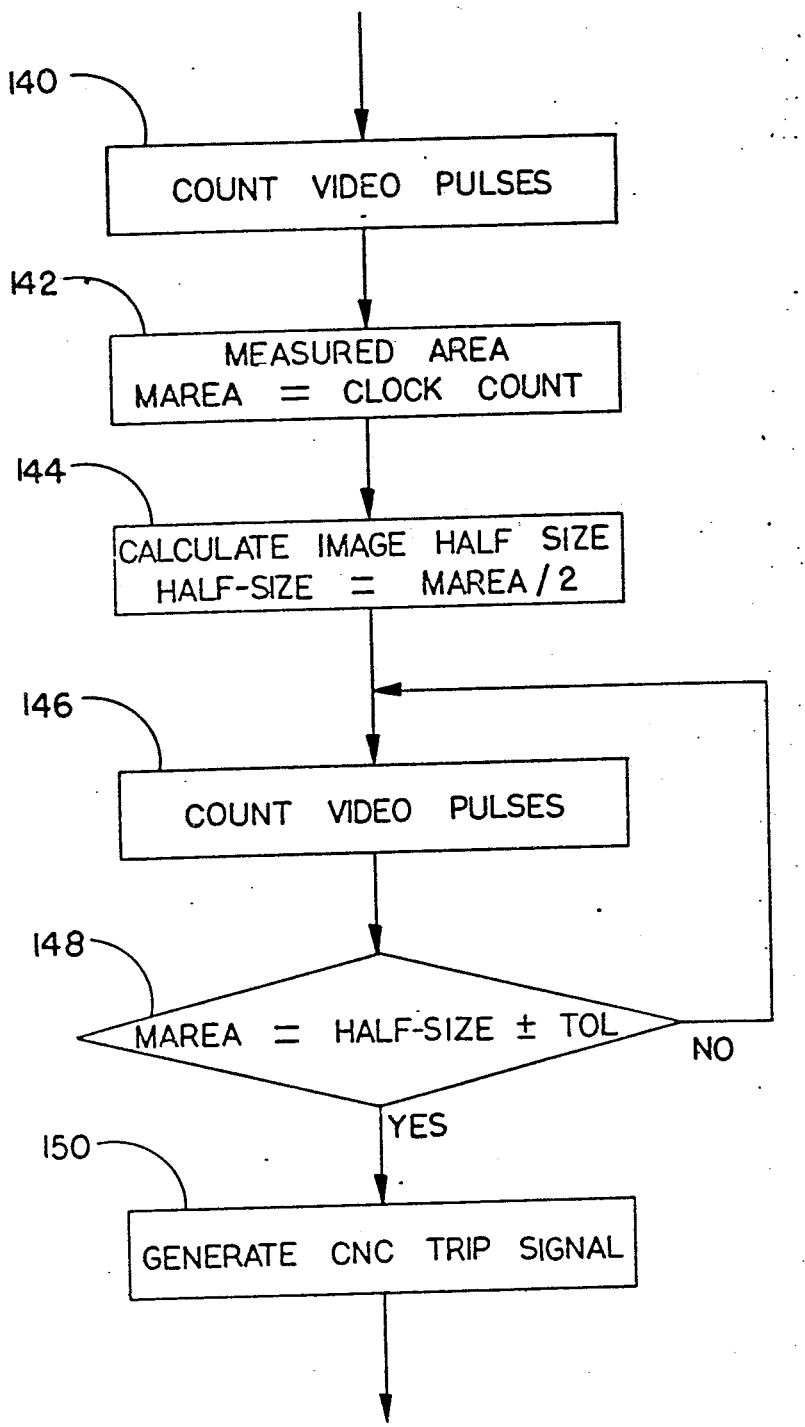
FIG. 7 is a flow chart of a process for performing edge detection.

FIG. 7 is a flow chart of a process for performing edge detection. The workpiece surface is first positioned in the path of light beam 16. Clock pulses from AND gate 40 in FIG. 2 are totaled (block 140) and the spot image area is set equal to the clock pulse count during one frame scan by camera 20 (block 142). The half spot area is calculated and saved (block 144). As the CNC moves the workpiece, image area is constantly measured (block 146) and compared with the saved half spot area (block 148). A trip signal indicating the location of a workpiece edge is generated when the measured area of the current spot image equals, within a predetermined tolerance, the saved half spot area (block 150). It should be noted that there is no need to focus the spot image prior to step 138. Also, the edge detection function is independent of direction of approach and independent of moving from light to dark or from dark to light.

From the foregoing specification it will be clear to those skilled in the art that the present invention is not limited to the specific embodiments described and illustrated and that numerous modifications and changes are possible without departing from the scope of the present invention. For example, the invention as described above uses a visible HeNe laser beam and a closed circuit television camera to obtain information from the surface of the workpiece. The light source need not be HeNe laser device, however, and the television camera can, for example, be replaced with a vidicon camera or a line-scan camera. Additionally the present implementation assumes that the image is bright with a relatively dark background. By some simple changes in the microcomputer software, the system could be made to detect a dark image on a bright background, such as a dark hole in an illuminated surface.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. Apparatus for positioning a surface, comprising: means for illuminating a shape on said surface; imaging means including a lens having a known focal length for receiving light reflected from said surface and forming an image of said shape; means for measuring the size of said image; means for varying the position of said surface relative to said lens thereby varying the size of said image; means for determining the position of said surface relative to said lens resulting in the smallest size of said image.

2. Apparatus according to claim 1, wherein: said imaging means comprises a television camera, said camera being responsive to light received to generate a series of video pulses; and said means for measuring includes means for counting said video pulses.

3. Apparatus according to claim 1, wherein: said means for illuminating comprises means for projecting a collimated light beam; and said shape comprises a light spot formed on said surface by said light beam.

4. Apparatus according to claim 3, wherein said means for projecting a light beam is a HeNe laser.

5. Apparatus for positioning a surface, comprising: means for illuminating said surface: a camera including a photosensitive array and a scanning mechanism; a lens having a known focal length for focusing light reflected from said surface onto said photosensitive array within said camera, said camera being responsive to the intensity of light impinging said photosensitive array to generate a series of video pulses; means responsive to said video pulses to generate a series of logic pulses, a separate logic pulse being generated for each of said video pulses having an amplitude exceeding a predetermined value;

positioning means for varying the position of said surface relative to said lens; and a microcomputer for counting said logic pulses, said microcomputer further providing control signals to said positioning means to vary the position of said surface relative to said lens in response to said count.

6. Apparatus according to claim 5, further comprising means for restricting the transmittal of said logic pulses to said microcomputer to one logic pulse per horizontal scan by said television camera.

7. Apparatus according to claim 5, wherein:
said means for illuminating comprises means for projecting a collimated light beam;
said shape comprises a light spot formed on said surface by said light beam; and
said microcomputer provides control signals to said positioning means to position said surface relative to said lens at the distance resulting in the smallest logic pulse count per camera frame scan.

8. Apparatus according to claim 7, wherein said means for projecting a light beam is a HeNe laser.

9. Apparatus according to claim 7, further comprising:
means for generating a series of clock pulses;
means for counting said clock pulses occuring contemporaneously with said logic pulses;
means for calculating the area of said light spot from the count of said logic pulses;
means for calculating the area of said light spot from the count of said clock pulses; and
means for comparing the area calculated from said logic pulses with the area calculated from said clock pulses.

10. Apparatus according to claim 7, wherein said camera is a conventional television camera having a scanning rate of 60 frames per second.

11. Apparatus according to claim 10, wherein said microcomputer is programmed to count said logic pulses occuring between 5 milliseconds and 12 milliseconds of each frame scan.

12. Apparatus for positioning a surface, comprising:
a lens having a known focal length;
means for projecting a collimated light beam through said lens onto said surface;
means for measuring the area of said surface illuminated by said light beam;
means for varying the position of said surface relative to said lens thereby varying the area of surface illumination; and
means for determining the position of said surface relative to said lens resulting in the smallest area of surface illumination.

13. Apparatus according to claim 12, wherein said means for projecting a light beam is a HeNe laser.

14. Apparatus according to claim 12, wherein said means for measuring comprises:
image sensing means responsive to light reflected from said surface to generate a series of video pulses; and
means for counting said video pulses.

15. Apparatus according to claim 13, wherein said image sensing means comprises a television camera.

16. Apparatus for positioning a surface, comprising:
a lens having a known focal length;
means for projecting a collimated light beam through said lens onto said surface;
a television camera positioned to view said surface, said camera being responsive to light reflected from said surface to produce a series of video pulses;
means responsive to said video signal to generate a series of logic pulses, a separate logic pulse being generated for each of said video pulses having an amplitude exceeding a predetermined value;
positioning means for varying the position of said surface relative to said lens;
A microcomputer for counting said logic pulses occurring during successive television frame scans, said microcomputer further providing control signals to said positioning means to position said surface relative to said lens at the distance resulting in the smallest logic pulse count per camera frame scan.

17. Apparatus according to claim 16, wherein said camera is a conventional television camera having a scanning rate of 60 frames per second and said microcomputer is programmed to count said logic pulses occurring between 5 milliseconds and 12 milliseconds of each frame scan.

18. Apparatus according to claim 16, wherein said means for projecting a light beam is a HeNe laser.

19. A method for positioning a surface, said method comprising the steps of:
illuminating a shape on said surface;
utilizing a lens having a known focal length to form an image of said shape;
measuring the area of said image; and varying the position of said surface relative to said lens to obtain a minimum image size.

20. The method of claim 19, wherein:
said lens forms said image on the photosensitive array within a camera, said camera being responsive to the intensity of light impinging said photosensitive array to generate a series of video pulses; and
said step of measuring the area of said image includes the step of counting said video pulses.

21. A method for positioning a surface, said method comprising the steps of:
illuminating a shape on said surface;
utilizing a lens having a known focal length for focusing light reflected from said surface onto a photosensitive array within a television camera, said camera being responsive to the intensity of light impinging said photosensitive array to generate a series of video pulses;
generating a series of logic pulses, a separate logic pulse being generated for each of said video pulses having an amplitude exceeding a predetermined value;
electronically counting the logic pulses occuring during successive television frame scans;
comparing the logic pulse count associated with each television camera scan with the logic pulse count associated with the previous television camera scan; and
incrementally adjusting the position of said surface relative to said lens in response to said pulse count comparison.

22. The method of claim 21, wherein:
said step of illuminating includes the step of projecting a collimated light beam onto said surface, said shape comprising a light spot formed on said surface by said light beam; and said step of adjusting the position of said surface relative to said lens includes the step of positioning said surface relative to said lens at the distance resulting in the smallest logic pulse count per camera frame scan.

23. The method of claim 22, wherein said collimated light beam is a HeNe laser beam.

24. A method for positioning a surface, said method comprising the steps of:

forming a light spot on said surface;

utilizing a lens having a known focal length for focusing light reflected from said surface onto a photosensitive array within a television camera, said camera being responsive to the intensity of light impinging said photosensitive array to generate a series of video pulses;

generating a series of logic pulses, a separate logic pulse being generated for each of said video pulses having an amplitude exceeding a predetermined value;

electronically counting the logic pulses occuring during successive television frame scans;

storing the logic pulse count associated with a first television frame scan;

comparing the logic pulse count associated with a second television frame scan with the logic pulse count associated with said first television frame scan and storing the lower value as the minimum pulse count value;

comparing the logic pulse count associated with each subsequent television frame scan with the stored minimum value and storing the lower value as the new minimum pulse count value;

moving said surface toward said lens until an increase in the logic pulse count per frame scan is obtained;

moving said surface away from said lens until an increase in the logic pulse count per frame scan is obtained; and moving said surface toward said lens until the logic pulse count per frame scan equals the stored minimum value.

25. A method for locating a surface edge, the steps comprising:

forming a light spot on said surface;

viewing said surface with a television camera, said television camera being responsive to light reflected from said surface to generate a series of video pulses;

generating a series of logic pulses, a separate logic pulse being generated for each of said video pulses having an amplitude exceeding a predetermined value;

electronically counting the logic pulses occuring during successive television frame scans;

dividing the logic pulse count obtained during a first television frame scan by two and storing the result;

comparing the logic pulse count associated with each subsequent television frame scan with the stored value;

moving the location of said light spot on said surface until the difference between the current logic pulse count per frame scan and the stored value is below a predetermined value.

26. A method for tracking a surface, the steps comprising:

forming a light spot on said surface;

utilizing a lens having a known focal length for focusing light reflected from said surface onto a photosensitive array within a television camera, said camera being responsive to the intensity of light impinging said photosensitive array to generate a series of video pulses;

generating a series of logic pulses, a separate logic pulse being generated for each of said video pulses having an amplitude exceeding a predetermined value;

electronically counting the logic pulses occuring during successive television frame scans;

storing the logic pulse count obtained during a first television frame scan;

comparing the logic pulse count associated with each subsequent television frame scan with the stored value;

moving the location of said light spot on said surface;

incrementally adjusting the position of said surface relative to said lens until the difference between the current logic pulse count per frame scan and the stored value is below a predetermined value.

27. A method for positioning a surface, said method comprising the steps of:

projecting a collimated light beam onto said surface through a lens having a known focal length;

measuring the area of said surface illuminated by said light beam; and varying the position of said surface relative to said lens to obtain a minimum area of surface illumination.

28. A method for positioning a surface, said method comprising the steps of:

projecting a collimated light beam through a lens having a known focal length onto said surface;

viewing said surface with a television camera, said television camera being responsive to light reflected from said surface to generate a series of video pulses;

generating a series of logic pulses, a separate logic pulse being generated for each of said video pulses having an amplitude exceeding a predetermined value;

electronically counting the logic pulses occuring during successive television scans;

comparing the logic pulse count associated with each television scan; and incrementally adjusting the position of said surface relative to said lens to reduce said pulse count to a minimum value.

29. The method of claim 28, wherein said collimated light beam is a visible HeNe laser beam.

30. The method of claim 28, wherein said television camera has a scanning rate of 60 frames per second and said counting step comprises counting the logic pulses occurring between 5 milliseconds and 12 milliseconds of each frame scan.

31. A method for positioning a surface, said method comprising the steps of:

projecting a collimated light beam onto said surface through a lens having a known focal length;

viewing said surface with a television camera, said television camera being responsive to light reflected from said surface to generate a series of video pulses;

generating a series of logic pulses, a separate logic pulse being generated for each of said video pulses having an amplitude exceeding a predetermined value;

electronically counting the logic pulses occuring during successive television frame scans;

storing the logic pulse count associated with a first television scan of said surface;

comparing the logic pulse count associated with a second television frame scan with the logic pulse count associated with said first frame scan and storing the lower value as the minimum pulse count value;

comparing the logic pulse count associated with each subsequent television frame scan with the stored minimum value and storing the lower value as the new minimum pulse count value;

moving said surface toward said lens until an increase in the logic pulse count per frame scan is obtained;

moving said surface away from said lens until an increase in the logic pulse count per frame scan is obtained; and moving said surface toward said lens until the logic pulse count per frame scan equals the stored minimum value.

* * * * *